United States Patent

[11] 3,576,276

| [72] | Inventors | John P. Clarke<br>126 A St., 89415;<br>Newell K. Rasmussen, Box 1115,<br>Hawthorne, Nev. 89415 |
|---|---|---|
| [21] | Appl. No. | 677,798 |
| [22] | Filed | Oct. 24, 1967 |
| [45] | Patented | Apr. 27, 1971 |

[54] METHOD AND APPARATUS FOR IMPLANTING INSECTICIDES INTO PLANTS
9 Claims, 8 Drawing Figs.

[52] U.S. Cl. ................................................. 222/1,
222/386, 128/214.4
[51] Int. Cl. ..................................................... G01f 11/00
[50] Field of Search........................................ 222/1, 386,
572; 128/221, 215, 347, 214.4; 239/(Inquired);
17/42.1; 47/57.5; 21/73, 63, 7; 239/103—105,
288.3, 288.5, 288

[56] References Cited
UNITED STATES PATENTS
1,147,933  7/1915  Ford............................. 239/288

| 2,796,701 | 6/1957 | Mauget........................ | 21/73X |
| 3,291,128 | 12/1966 | O'Neil......................... | 222/386X |
| 3,366,286 | 1/1968 | Kloehn........................ | 222/386 |

FOREIGN PATENTS

| 265,972 | 9/1913 | Germany..................... | 128/214.4 |
| 624,269 | 6/1949 | Great Britain............... | 128/214.4 |

*Primary Examiner*—Robert B. Reeves
*Assistant Examiner*—Norman L. Stack, Jr.
*Attorneys*—J. P. Dunlavey and E. F. Johnston ABSTRACT: Insecticide injection system for plants in which a hollow headed needle is driven into the plant, a disposable-type plastic syringe barrel is attached to the head of the hollow needle, a measured amount of insecticide is injected into the headed needle and the syringe barrel with a hypodermic syringe having a needle which extends completely through the barrel and into the headed needle, which is then withdrawn and a piston plunger inserted into the syringe barrel.

PATENTED APR 27 1971 3,576,276
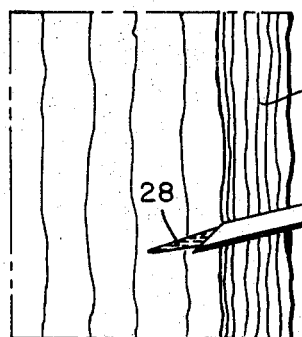
FIG. 1.
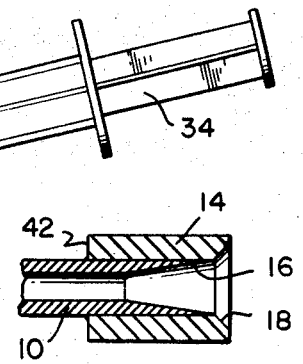
FIG. 6.
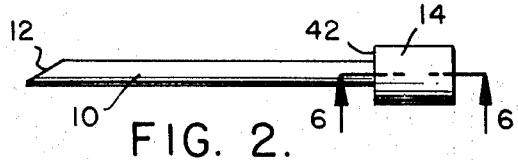
FIG. 2.
FIG. 3.
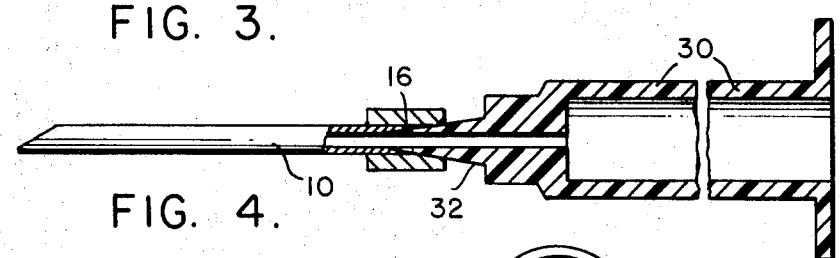
FIG. 4.
FIG. 5.
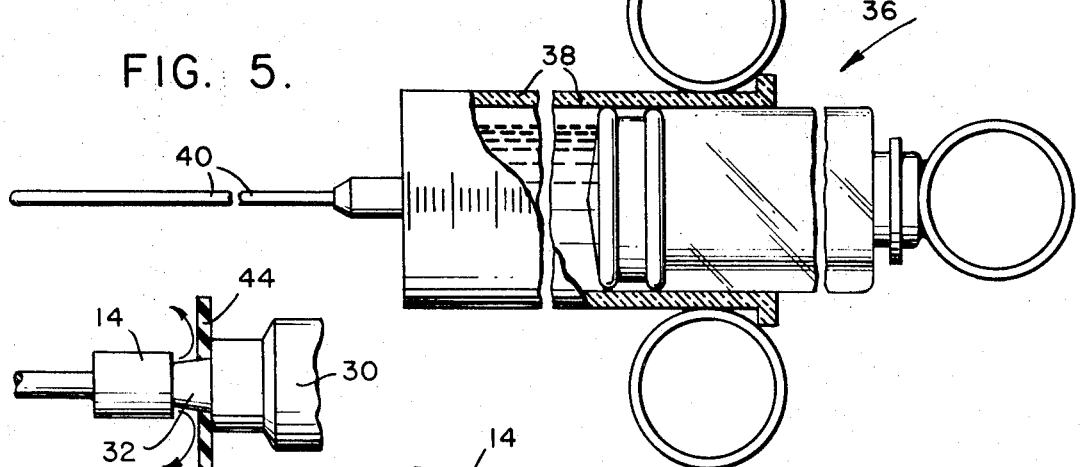
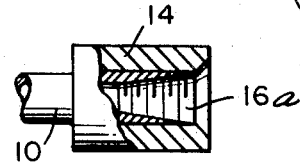
FIG. 8.   FIG. 7.
INVENTORS.
JOHN P. CLARKE
NEWELL K. RASMUSSEN
BY
V. C. MULLER
ROY MILLER
ATTORNEYS.

METHOD AND APPARATUS FOR IMPLANTING INSECTICIDES INTO PLANTS

The invention described herein may be manufactured and used by or for the Government of the United States of America for governmental purposes without the payment of any royalties thereon or therefor.

One of the objects of the invention is to provide apparatus for injecting insecticides into plants, such as trees and shrubs, which, with the exception of one inexpensive part, utilizes commercially available inexpensive components.

Another object is to provide a method of injection, utilizing the apparatus aforesaid.

Still further objects, advantages, and salient features will become apparent from the description to follow, the appended claims, and the accompanying drawing, in which:

FIG. 1 is a section of a plant, such as a tree, with the subject of the invention applied thereto during the step of feeding insecticide to the plant;

FIG. 2 is a side elevation of a hollow needle;

FIG. 3 is a side elevation of a tool for inserting the needle into a plant;

FIG. 4 is a cross section of a hypodermic syringe barrel, attached to the needle of FIG. 2;

FIG. 5 is a cross section of a hypodermic syringe, a major portion being broken out, for applying liquid to the assembly of FIG. 4;

FIG. 6 is an enlarged section taken on line 6—6, of FIG. 2;

FIG. 7 is a modification of FIG. 6; and

FIG. 8 is an optional attachment which may be employed.

Referring now to the drawing and first to FIGS. 2 and 6, hollow needle 10 is similar to a hypodermic needle used in the medical profession except that it is larger, being of the order of 3/16-inch diameter and 3 inches long. Its delivery end 12 is beveled like a conventional hypodermic needle and its other end is provided with a head 14 having a tapered bore 16 for receiving the tapered tip of a hypodermic syringe to be subsequently described. Preferably, this is constructed from commercially available tubing, such as steel, the head 14 also being tubular to receive one end of the needle which is attached by silver solder or brazing material after which tapered bore 16 is reamed to size. When cost is not of importance the needle and its head may be constructed from one piece of metal, such as solid bar stock or thick wall tubing turned to proper dimensions. A chamfer 18 is preferably provided at the outer end of the tubular bore to prevent upsetting of the outer end of the bore by the inserting tool to next be described.

The inserting tool, FIG. 3, comprises a rod 20 which is drilled at one end to receive a pin 22 which is silver soldered or brazed in the drilled aperture, this construction permitting use of commercially available round bar stock and eliminating machining operations. The length of the pin exceeds the length of the needle, and the tip 24 which projects beyond the end of the needle is tapered to facilitate removal from the needle and plant. In the application of the needle to a plant, pin 22 is inserted into the needle and hammer blows applied to the head 26 of the inserting tool until the needle is driven into the plant to a desired depth. As best shown in FIG. 1, a void 28 is left in plant P, beyond the end of the needle, after the tool is removed from the needle, which increases the rate at which the plant will absorb the insecticide.

Referring now to FIG. 4, syringe barrel 30 is of the disposable plastic-type used by the medical profession, having a tapered end 32 which fits a conventional hypodermic needle (not shown). Its plunger 34 (FIG. 1) is also conventional. A 3 cc. capacity barrel has been found satisfactory, although other sizes may be employed, depending on the quantity of insecticide to be administered by each needle.

Referring now to FIG. 5, the supply of the insecticide is contained in a commercially available hypodermic needle 36 having a graduated barrel 38 of relatively large capacity and a needle portion 40 of a length to extend through barrel 30 and into needle 10.

In the operation of the parts so far described, a plurality of needles 10 are driven into the plant to a desired depth by the tool of FIG. 3 at an upward angle, as shown in FIG. 1. A barrel 30 is then applied to each needle, and needle portion 40 of FIG. 5 is inserted (not shown) into the barrel and needle assembly of FIG. 1. The desired quantity of insecticide is then delivered from barrel 38 after which the hypodermic needle 36 is removed. With this method of applying the insecticide, first to needle 10, and thence outward into barrel or reservoir 30, entrapment of air is obviated which facilitates more rapid absorption of the insecticide by the plant.

After hypodermic needle 36 has been removed, plunger 34 is applied to barrel 30 and depressed, slightly compressing the air between the insecticide and the plunger. After a few minutes, the vascular system of the plant will withdraw the insecticide from barrel or reservoir 30 and needle 10. The needle may then be removed by a claw hammer, the claws of which may engage shoulder 42 on head 14 in the same manner as removing a headed nail from wood with a claw hammer.

FIG. 7 illustrates a modification of the needle in which tapered bore 16a is provided with fine threads. With this construction barrel 30 may be rotated in the bore and the threads will cut corresponding threads on the soft plastic tip 32, thus providing a more secure attachment.

FIG. 8 illustrates another modification in which a resilient apertured disc 44, such as rubber, is applied to tip 32 to prevent insecticide from contacting the operator in the event leakage occurs at the tip when the plunger is depressed. As indicated by the arrows, the disc serves as a baffle to direct any leakage toward the plant rather than toward the operator.

Obviously many modifications and variations of the present invention are possible in the light of the above teachings. It is therefore to be understood that within the scope of the appended claims the invention may be practiced otherwise than as specifically described.

We claim:

1. Apparatus for applying a liquid chemical, such as insecticide, to a plant comprising;
    a hollow needle having an enlarged driving head with a tapered bore,
    the head of said hollow needle being provided with an abutment for engaging a prying tool, such as a claw hammer, for removing the hollow needle from the plant,
    a syringe barrel having a tapered delivery tip fitting said bore and forming an axial extension to said hollow needle.
    a hypodermic syringe having a needle of sufficient length to be inserted through said barrel and into said hollow needle, whereby the hollow needle may first be filled with said chemical and said syringe barrel may next be partially filled by outward flow from said hollow needle, to thereby obviate entrapment of air.

2. Apparatus in accordance with claim 1, including the mating plunger for said barrel.

3. Apparatus in accordance with claim 2, including a tool for driving said hollow needle into the plant, said tool having an abutment for engaging said head and pin extending through the hollow needle and beyond its end for puncturing the plant and providing a void space beyond the end of the hollow needle after the tool is removed therefrom.

4. Apparatus in accordance with claim 3, including a chamfer at the outer end of said tapered bore for preventing upsetting of its outer edge by said abutment.

5. Apparatus in accordance with claim 3 wherein the tapered delivery tip of the syringe barrel is plastic and said tapered bore is provided with threads adapted to cut mating threads on said tapered delivery tip.

6. Apparatus in accordance with claim 3, including a baffle plate received by said delivery tip, for directing leakage chemical away from an operator, when the plunger is inserted, and in the event of leakage around said tip.

7. Apparatus in accordance with claim 6 wherein said baffle plate is constructed of rubber.

8. A method of applying a liquid chemical, such as insecticide, to a plant, comprising the steps of;

driving a hollow needle, having an enlarged head with a tapered bore, into the plant to a desired depth, inserting the tapered delivery tip of a syringe barrel into the tapered bore, inserting the needle of a hypodermic syringe through the barrel and into said hollow needle, ejecting a measured quantity of the chemical from the hypodermic syringe, filling first said hollow needle and thence partially filling said syringe barrel by outward flow from said hollow needle, thereby obviating entrapment of air, and inserting the mating plunger of the syringe barrel thereinto and forcing said chemical into the plant.

9. A method in accordance with claim 8 including the further step of:

engaging the enlarged head of the hollow needle with a prying tool and prying said hollow needle from the plant.